US008826157B2

(12) United States Patent
Krantz et al.

(10) Patent No.: US 8,826,157 B2
(45) Date of Patent: Sep. 2, 2014

(54) SYSTEM AND METHOD TO GENERATE A SHOPPING CART LIST

(75) Inventors: David Krantz, San Antonio, TX (US); Lee Culver, San Antonio, TX (US); Justin Marcucci, Chester, NJ (US); Susan Novell, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1368 days.

(21) Appl. No.: 11/848,881

(22) Filed: Aug. 31, 2007

(65) Prior Publication Data

US 2009/0064009 A1   Mar. 5, 2009

(51) Int. Cl.
*G06Q 30/00* (2012.01)
*G06Q 50/00* (2012.01)
*G06F 17/30* (2006.01)
*G06Q 20/00* (2012.01)
*G06Q 30/06* (2012.01)

(52) U.S. Cl.
CPC ............ *G06Q 30/0633* (2013.01); *G06Q 30/06* (2013.01); *G06Q 30/0641* (2013.01)
USPC .......... 715/762; 705/26.8; 705/26.1; 715/848

(58) Field of Classification Search
CPC  G06Q 30/0633; G06Q 30/06; G06Q 30/0641
USPC ......................... 715/762, 848; 705/26.8, 26.1
See application file for complete search history.

(56) References Cited

U.S. PATENT DOCUMENTS

| | | | |
|---|---|---|---|
| 5,948,061 A | 9/1999 | Merriman et al. | |
| 6,285,987 B1 | 9/2001 | Roth et al. | |
| 6,317,761 B1 | 11/2001 | Landsman et al. | |
| 6,381,583 B1 * | 4/2002 | Kenney | 705/26.8 |
| 6,636,246 B1 | 10/2003 | Gallo et al. | |
| 6,724,403 B1 | 4/2004 | Santoro et al. | |
| 7,013,435 B2 | 3/2006 | Gallo et al. | |
| 7,058,598 B1 * | 6/2006 | Chen et al. | 705/26.8 |
| 7,069,235 B1 | 6/2006 | Postelnik et al. | |
| 7,376,591 B2 * | 5/2008 | Owens | 705/26.8 |
| 7,680,694 B2 * | 3/2010 | Glazer et al. | 705/26.43 |
| 7,778,878 B2 * | 8/2010 | Harding et al. | 705/26.1 |
| 2001/0007099 A1 * | 7/2001 | Rau et al. | 705/26 |
| 2001/0028369 A1 * | 10/2001 | Gallo et al. | 345/848 |
| 2001/0034661 A1 * | 10/2001 | Ferreira | 705/26 |
| 2002/0163546 A1 | 11/2002 | Gallo | |
| 2003/0229900 A1 * | 12/2003 | Reisman | 725/87 |
| 2004/0044627 A1 * | 3/2004 | Russell et al. | 705/50 |
| 2005/0065855 A1 * | 3/2005 | Geller | 705/26 |

(Continued)

OTHER PUBLICATIONS

Selvaratnam, Subashini; Putting business online;Jan. 22, 2007; New Straits Times; Kuala Lumpur, p. 02.*

(Continued)

*Primary Examiner* — Jordany Nunez
(74) *Attorney, Agent, or Firm* — Toler Law Group, PC

(57) ABSTRACT

A system to generate a shopping cart list is provided. The system includes a three-dimensional graphical display module to generate an interactive graphical display at a display device. The interactive graphical display includes a plurality of independent display elements associated with a representation of a three-dimensional object. The system also includes a shopping cart module to generate a shopping cart list including purchasable items selected from a plurality of independent storefront sites and to display the shopping cart list at the display device.

25 Claims, 4 Drawing Sheets

(56) References Cited

U.S. PATENT DOCUMENTS

2006/0156228 A1    7/2006  Gallo et al.
2007/0179867 A1*  8/2007  Glazer et al. .................... 705/27
2008/0319872 A1* 12/2008  Russell et al. ................. 705/26
2010/0185514 A1*  7/2010  Glazer et al. .............. 705/14.51

OTHER PUBLICATIONS

"2D Search Officially Obsolete: SpaceTime Reinvents Searching the Web", Space Time BETA, Jun. 4, 2007, SpaceTime, Inc., New York, NY, 2 pages.

Fusco, P., "AT&T's Ad-Supported Internet Access Plan", ISP Planet, Jul. 21, 2000, Retrieved at <<http://www.isp-planet.com/news/cheap_att.html>>, Retrieved on Aug. 2, 2007, 4 pages.

SpaceTime BETA Home Page, Retrieved at <<http://www.spacetime.com/>>, Retrieved on Aug. 31, 2007, SpaceTime, Inc., 2 pages.

Woods, B., "Juno Offering Free Ad-Supported Web Access", Update Dec. 20, 1999, Newsbytes News Network, Retrieved from <<http://findarticles.com/p/articles/mi_mONEW/is_1999_Dec_20/ai5832561/print>>, Retrieved on Aug. 2, 2007, Gale Group, New York, NY, 2 pages.

* cited by examiner

SYSTEM AND METHOD TO GENERATE A SHOPPING CART LIST

FIELD OF THE DISCLOSURE

The present disclosure is generally related to a system and method to generate a shopping cart list.

BACKGROUND

With the increase in Internet access and online storefront sites, online shopping has become more common. Often, for comparison shopping purposes, a user may visit multiple storefront sites to compare purchase information before making a purchase. Many online storefront sites simplify making purchases at the particular site by providing a "shopping cart." However, the shopping cart only tracks items selected by a customer for purchase at the particular storefront site. Hence, there is a need for an improved system and method of generating a shopping cart list.

DETAILED DESCRIPTION OF THE DRAWINGS

A system to generate a shopping cart list is disclosed. The system includes a three-dimensional graphical display module to generate an interactive graphical display at a display device. The interactive graphical display includes a plurality of independent display elements associated with a representation of a three-dimensional object. The system also includes a shopping cart module to generate a shopping cart list including purchasable items selected from a plurality of independent storefront sites and to display the shopping cart list at the display device.

A system to generate a shopping cart list is disclosed. The system includes a three-dimensional graphical display module to generate an interactive graphical display at a display device. The interactive graphical display includes a plurality of independent display elements associated with a representation of a three-dimensional object. The system also includes an input to receive data indicating a selection of a purchasable item depicted at one of the plurality of independent display elements. The system also includes a shopping cart module to send a purchase request to a storefront site based on the received input data.

A method of generating a shopping cart list is also disclosed. The method includes generating a three-dimensional graphical display including a plurality of independent display elements associated with a representation of a three-dimensional object. The method also includes receiving data indicating selection of a purchasable item depicted at a first display element of the plurality of display elements. The method also includes selecting a storefront site and placing an order for the purchasable item at the storefront site.

A processor-readable medium is also disclosed. The processor-readable medium includes instructions to cause a processor to execute a method including generating a three-dimensional graphical display including a plurality of independent display elements associated with a representation of a three-dimensional object. The method also includes receiving input associated with a first display element of the plurality of independent display elements. The method further includes storing data associated with the received input at a shopping cart list. The method also includes generating a purchase request based on the shopping cart list.

Figure 1:
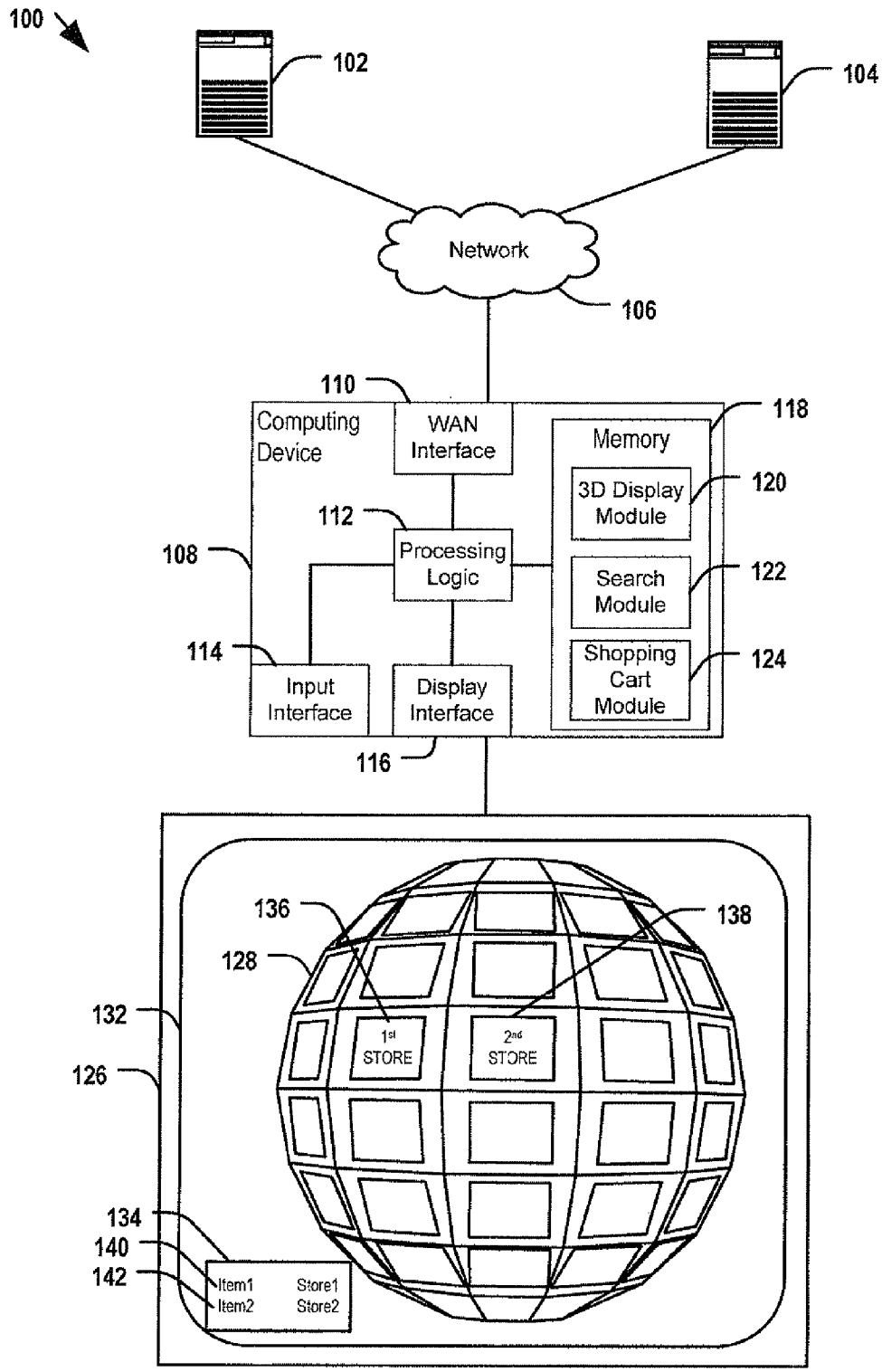
FIG. 1 is a diagram of a particular embodiment of a system to generate a shopping cart list.

FIG. 1 depicts a first embodiment of a system to generate a shopping cart list, the system generally designated 100. The system 100 includes a computing device 108 coupled to a display device 126. The computing device 108 is also coupled to a network 106. The network 106 may be coupled to a plurality of servers associated with various electronic storefronts. For example, the plurality of servers may include a first storefront server 102 associated with a first electronic storefront and a second storefront server 104 associated with a second electronic storefront. In a particular illustrative embodiment, the computing device 108 may include a set-top box device, and the display device 126 may include a television display device. For example, the network 106 may include an access network of an Internet Protocol Television (IPTV) system.

In a particular embodiment, the computing device 108 may include a wide area network (WAN) interface 110 coupled to processing logic 112. The WAN interface 110 may be adapted to enable data communications between the computing device 108 and the storefront servers 102, 104 via the network 106. The computing device 108 may also include a display interface 116 coupled to the display device 126 and an input interface 114 coupled to one or more input devices (not shown) such as a keyboard, a mouse, a remote control device, a voice interface, a touch screen interface, any other human/machine interface device, or any combination thereof. The computing device 108 may also include a memory 118 accessible to the processing logic 112 to store data received from the storefront servers 102, 104 and to store software instructions executable by the processing logic 112.

In a particular embodiment, the computing device 108 includes a three-dimensional graphical display module 120. The three-dimensional graphical display module 120 may be adapted to generate an interactive graphical display 132 at the display device 126. The interactive graphical display 132 may include a plurality of independent display elements, such as a first display element 136 associated with a first electronic storefront site and a second display element 138 associated with a second electronic storefront site. In an illustrative embodiment, the independent display elements may be associated with a representation of a three-dimensional object 128, such as a sphere, a cube, another three-dimensional object or set of three-dimensional objects, or any combination thereof. In a particular illustrative embodiment, the representation of the three-dimensional object may include a representation of one or more storefronts, e.g., all of, or a portion of a building. For example, the independent display elements may appear as individual storefronts in a representation of a shopping mall. The interactive graphical display 132 may allow a user to modify a view of the three-dimensional object 128 and the associated display elements. For example, the view may be modified by rotating a view of the representation of the three-dimensional object 128, zooming closer to or further from any particular display element, selecting and interacting with particular display elements, or any combination thereof. In a particular embodiment, the interactive graphical display 132 can be generated by a user interface application such as the Vizible Platform, available from Vizible Corporation of Toronto, Ontario, Canada.

One or more of the interactive display elements, such as the first display element 136, may be associated with a browser application. The browser application receives data from and communicates data to the first storefront server 102 to allow the user to interact with the first electronic storefront site via the network 106. For example, the user may be able to select a purchasable item shown in the first display element 136 and to provide input via the input interface 114, indicating a desire to purchase the purchasable item.

The computing device 108 also includes a search module 122. The search module 122 may be adapted to identify the purchasable item based on input received from the user. The search module 122 may also use information displayed or associated with the purchasable item, the particular independent display element, a particular storefront site, or any combination thereof to identify the purchasable item. To illustrate, when a user selects a purchasable item via the first display element 136 and indicates a desire to purchase the item, the search module 122 may search data related to the first display element 136 for information related to the selected item. The data related to the first display element 136 may include data displayed at the first display element 136, data related to the first display element 136 available at the first storefront server 102, or any combination thereof. To illustrate, the information may include a description of the purchasable item, a model number of the purchasable item, price information related to the purchasable item, shipping information related to the purchasable item, availability or stock information related to the purchasable item, any other information identifying the purchasable item or purchase criteria associated with the purchasable item, or any combination thereof.

The computing device 108 may also include a shopping cart module 124. The shopping cart module 124 may store data associated with selected purchasable items in a shopping cart list 134. The shopping cart list 134 may store information related to a plurality of purchasable items selected from independent storefront sites, such as a first item 140 selected from a first storefront site and second item 142 selected from a second storefront site.

In a particular embodiment, the shopping cart module 124 may automatically query a plurality of independent storefronts sites, such as the first storefront server 102 and the second storefront server 104, to identify a storefront site selling the selected purchasable item. In an illustrative embodiment, one or more of the independent storefront sites queried may be a storefront site that is not associated with any of the independent display elements. That is, the shopping cart module 124 may query one or more storefront sites that are not displayed via the interactive graphical display 132. The shopping cart module 124 may also send an information request to one or more of the plurality of independent storefront sites to request information about purchasing the selected purchasable item via the storefront sites. For example, the shopping cart module 124 may request pricing information, shipping information, availability information, any other purchase information, or any combination thereof.

In a particular embodiment, the shopping cart module 124 may display information related to purchasing the purchasable item via one or more of the storefront sites via the shopping cart list 134. The information displayed may include information received from one or more storefront sites in response to information requests that were sent. The displayed information may assist a user with identifying a place to purchase the purchasable item.

In another particular embodiment, the shopping cart module 124 may automatically send a purchase request to a storefront site to purchase the purchasable item. For example, the purchase request may be based on received purchase information, user settings, or any combination thereof. The user settings may include a list of pre-approved storefront sites, a list of unacceptable storefront sites, a pre-approved purchase price, pre-defined payment information, other settings, or any combination thereof.

The shopping cart module 124 may also have settings adapted for selecting a particular storefront site. For example, the settings may indicate that a storefront site should be selected that has a lowest price for the selected item, available stock of the selected item, a lowest shipping cost for the selected item, a lowest total cost of the order (e.g., taking into account taxes, shipping and handling, cost of the product and so forth), a particular expected shipping time, any other selection criteria for selecting a storefront site, or any combination thereof. In an illustrative embodiment, the shopping cart module 124 may send information requests to one or more storefront sites that are not associated with any of the independent display elements. For example, when a purchasable item is selected at the first display element 136, the shopping cart module 124 may send an information request to a third storefront server (not shown) that is not associated with information displayed via the interactive graphical display 132. In another illustrative embodiment, the shopping cart module 124 may send a purchase request to one or more storefront sites that are not associated with any of the independent display elements. For example, the shopping cart module 124 may send a purchase request to a third storefront server (not shown) that is not associated with information displayed via the interactive graphical display 132.

Figure 2:
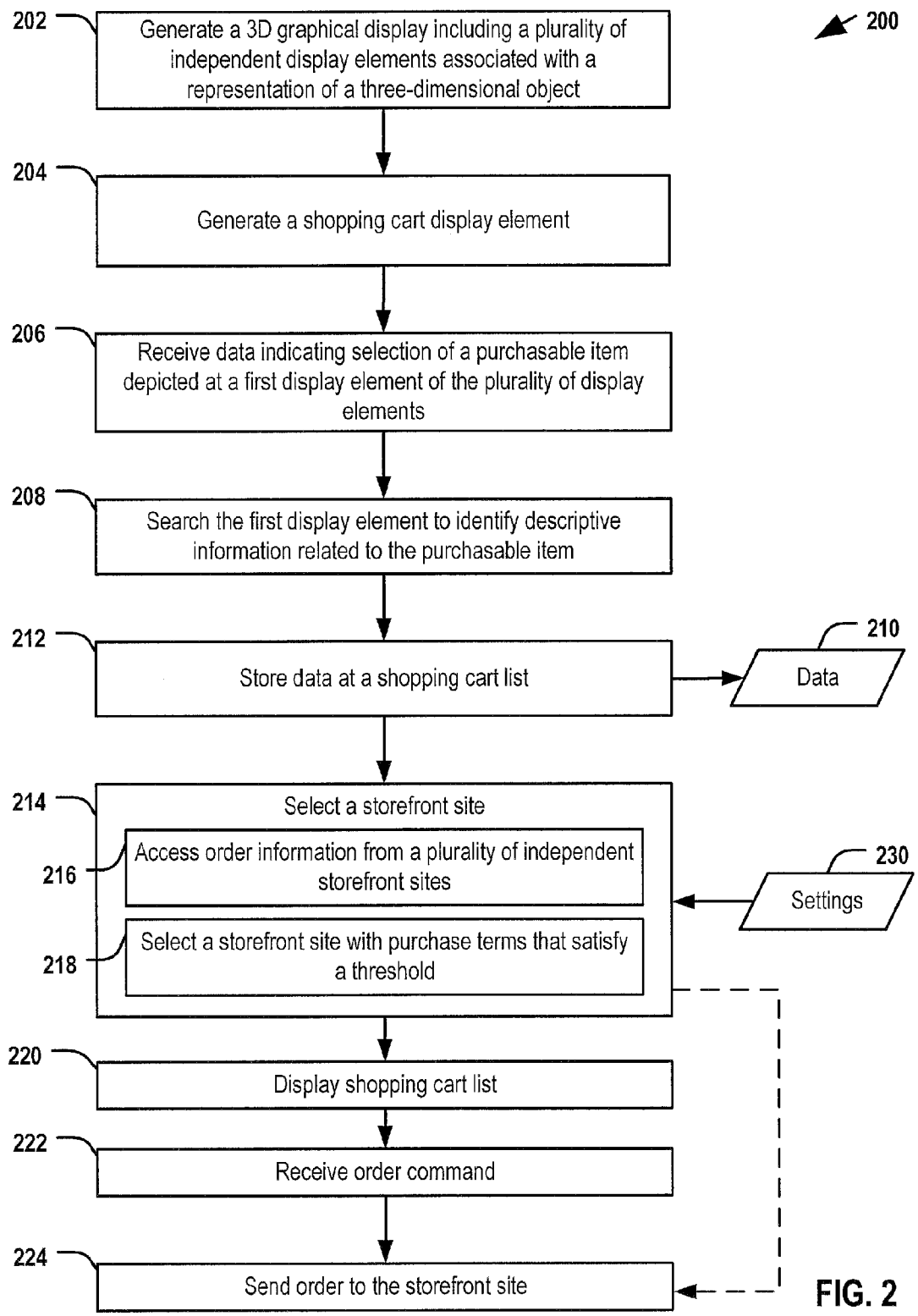
FIG. 2 is a flow chart of a particular embodiment of a method of generating a shopping cart list.

Referring to FIG. 2, a particular embodiment of a method of generating a shopping cart list is depicted and generally designated 200. The method 200 includes, at 202, generating a three-dimensional graphical display including a plurality of independent display elements. The independent display elements are associated with a representation of a three-dimensional object. In a particular embodiment, one or more of the independent display elements may be associated with a browser application.

The method 200 includes, at 204, generating a shopping cart display element. The shopping cart display element may be independent of the representation of the three-dimensional object. The method 200 also includes, at 206, receiving data indicating selection of a purchasable item depicted within a first independent display element of the plurality of display elements. For example, a user may interact with the three-dimensional graphical display to select a particular purchasable item at the first display element. The purchasable item may include any type of service, tangible good, intangible good, or any combination thereof that may be purchased. To illustrate, the purchasable item may include a consumer product.

The method 200 also includes, at 208, searching the first independent display element to identify descriptive information related to the purchasable item. For example, the method 200 may include searching the first display element to identify information such as a manufacturer's name, general descriptive information, a model number, a universal product code (UPC), pricing information, shipping information, specifications, any other information identifying the purchasable item, or any combination thereof. Additionally, the method 200 may include searching alternative sources of information related to the first independent display element to identify the descriptive information. For example, the search may include searching metadata associated with the purchasable item, searching a web page or storefront site associated with the purchasable item, or any combination thereof. The method 200 may also include, at 212, storing data 210 associated with the purchasable item at a shopping cart list.

In a particular embodiment, the method 200 may also include, at 214, selecting a storefront site. In an illustrative embodiment, the storefront site may be selected by accessing order information from a plurality of independent storefront sites, at 216. For example, information requests may be sent to a plurality of independent storefront sites requesting information associated with the purchasable item based on the descriptive information found during the search. In another example, the order information may be accessed by conducting a search based on text identified during the search for descriptive information related to the purchasable item. A storefront site may be selected, at 218, based on the order information and one or more threshold settings 230. For example, the thresholds settings 230 may include a price threshold, a shipping cost threshold, a shipping time threshold, any other information related to the purchase of the purchasable item, or any combination thereof.

The method 200 also includes, at 220, displaying information associated with one or more of the storefront sites and the purchasable item at the shopping cart display element. For example, the shopping cart display element may identify a list of storefront sites through which the purchasable item is available. In another example, the shopping cart display element may identify costs or other information associated with the purchasable item. In a particular embodiment, the shopping cart display element may include a plurality of purchasable items associated with independent electronic storefront sites.

The method may also include, at 222, receiving an order command. For example, the shopping cart display element may include a purchase now indication associated with one or more storefront sites. By selecting the purchase now indication associated with a particular storefront site, a user may authorize placing a purchase request for the purchasable item via the storefront site. The method 200 may also include, at 224, sending an order to the selected storefront site. In another embodiment, after a storefront site is selected, at 214, the method 200 may include, at 224, automatically sending an order to the selected storefront site for the purchasable item.

Figure 3:
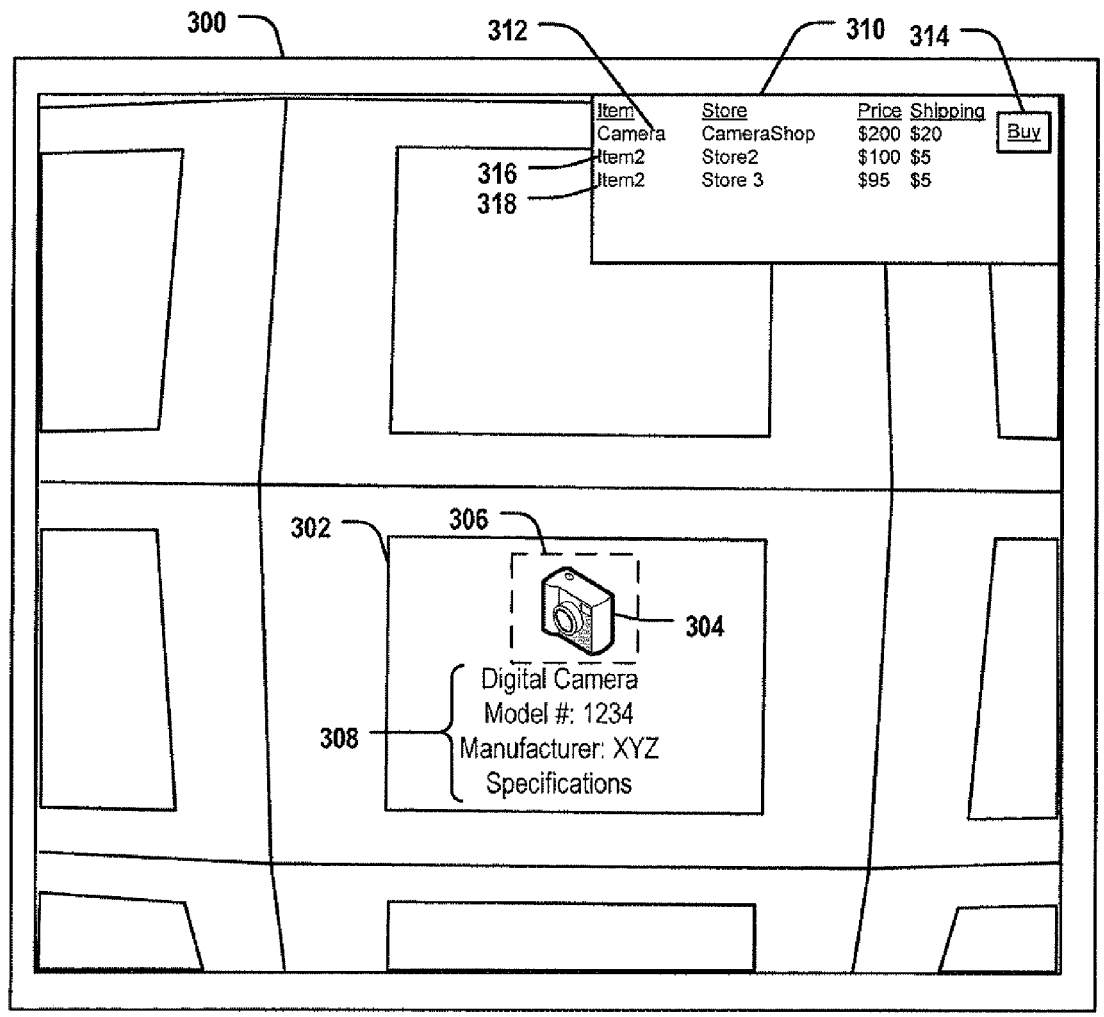
FIG. 3 is a diagram of a particular embodiment of a user interface to generate a shopping cart list.

Referring to FIG. 3, a particular embodiment of a user interface display to generate a shopping cart list is depicted and generally designated 300. The user interface display 300 includes a plurality of independent display elements, such as first independent display element 302. First independent display element 302, as illustrated, displays information related to a purchasable item 304 available via an electronic storefront site. The electronic storefront site also includes descriptive information 308 and an image 306 associated with the purchasable item 304. In a particular embodiment, a user may interact with the first independent display element 302 to select the purchasable item 304 and to indicate a desire to purchase the purchasable item 304. For example, the user may "right click" on the purchasable item 304 to display a context menu including an "add to shopping cart" option.

In a particular embodiment, a computing system associated with the user interface display may search data associated with the first independent display element 302 to identify the purchasable item, descriptive information 308 associated with the purchasable item, or any combination thereof. The descriptive information 308 associated with the purchasable item may include the image 306, a model number, a universal product code, a manufacturer name, specifications, other descriptive information or any combination thereof. The computing system associated with the user interface display may add the purchasable item 304 to a shopping cart list display 310.

The shopping cart list display 310 includes information 312 identifying a particular storefront site, the purchasable item, purchase information, other information related to purchasing the purchasable item, or any combination thereof. Additionally, the shopping cart display 310 may include a purchase indication, such as a "buy" selectable element 314. The buy selectable element 314 may allow the user to authorize purchase of the purchasable item at a particular electronic storefront site. In particular embodiment, the computing system associated with the user interface display 300 may automatically select a storefront site from which to order the purchasable item and place a purchase request to the selected storefront site without further input from the user, e.g., without the user selecting the buy selectable element 314.

In particular embodiment, when a purchasable item is added to the shopping cart, the computing system associated with the user interface display 300 may identify electronic storefront sites selling the purchasable item, and may identify one or more independent storefront sites selling the purchasable item in the shopping cart display 310. For example, when a second item ("item2") is added to the shopping cart, the computing system adds a shopping cart entry 316 associated with the second item to the shopping cart display 310 and identifies the electronic storefront at which the second item is selected, i.e., "Store2". Additionally, the computing system may identify a third electronic storefront, "Store3," that sells the second item at a lower total cost and add a second shopping cart entry 318 identifying that the second item is available from the third electronic storefront at a lower total cost.

In conjunction with the configuration of structure described herein, the systems and methods disclosed generate a shopping cart list. In a particular illustrative embodiment, a computing device generates a three-dimensional graphical display including a plurality of independent display elements arranged over a representation of a three-dimensional object. The computing device also receives data indicating selection of a purchasable item depicted at a first display element of the plurality of independent display elements. The computing device selects a storefront site and places an order for the purchasable item at the storefront site. The systems and methods provided allow a shopping cart list to be maintained at a local computing device. The shopping cart list can include purchasable items from a plurality of independent storefront sites. Additionally, the shopping cart list may be able to automatically perform comparison shopping activities and submit purchase requests when user defined criteria are met.

Figure 4:
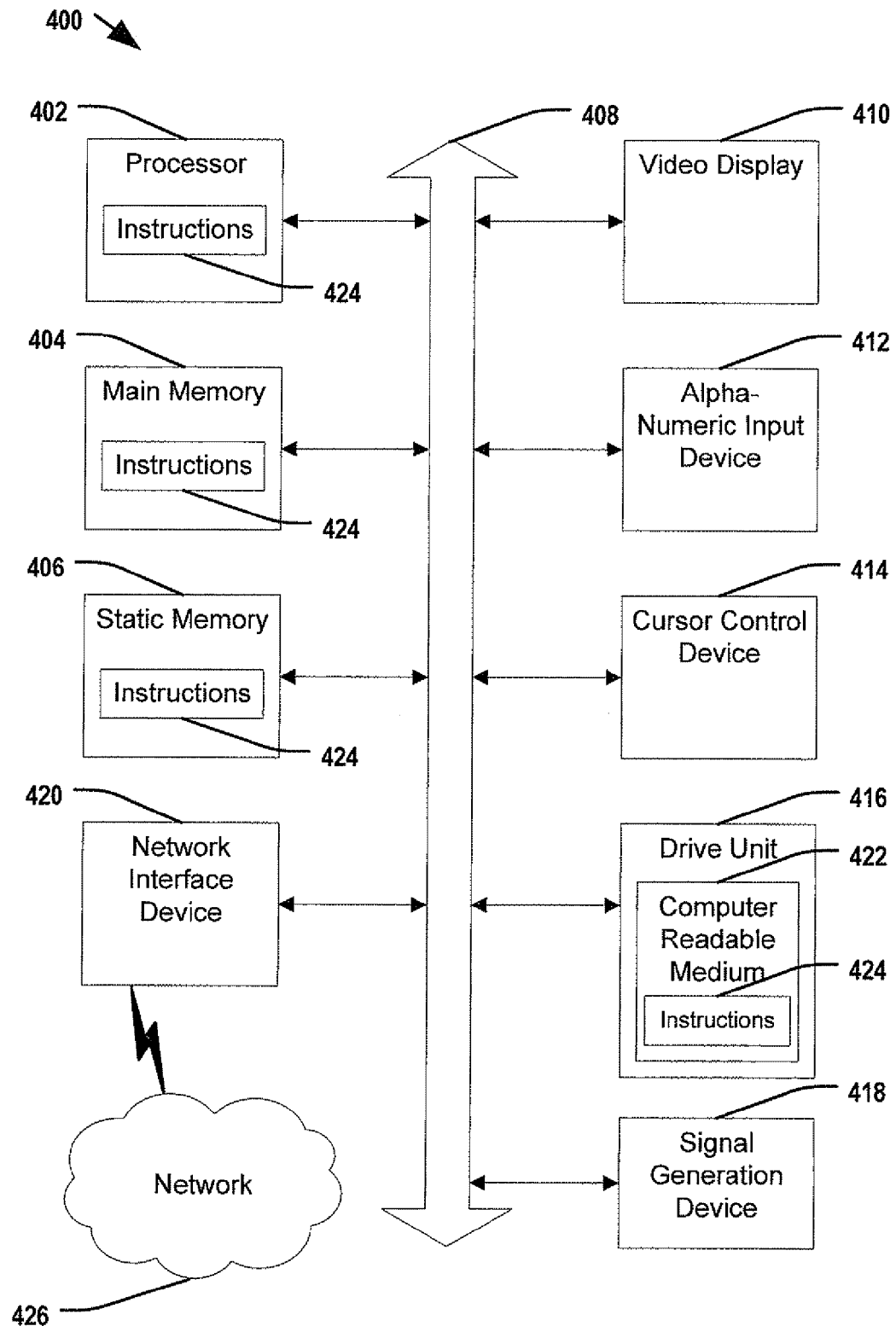
FIG. 4 is a block diagram of an illustrative embodiment of a computer system.

Referring to FIG. 4, an illustrative embodiment of a general computer system is shown and is designated 400. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. For example, the computer system may include or be included in any one or more of the computing device or storefront servers depicted in FIG. 1.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. Moreover, the computer system 400 can include a main memory 404 and a static memory 406, that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse or remote control device. The computer system 400 can also include a disk drive unit 416, a signal generation device 418, such as a speaker, and a network interface device 420.

In a particular embodiment, as depicted in FIG. 4, the disk drive unit 416 may include a computer-readable medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-nail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
    a hardware processor;
    a three-dimensional graphical display module executable by the hardware processor to generate an interactive graphical display at a display device, wherein the interactive graphical display includes a plurality of selectable and independent display elements associated with a representation of a three-dimensional object, and wherein a first selectable and independent display element represents a first storefront site and a second selectable and independent display element represents a second storefront site different than the first storefront site;
    an input coupled to the hardware processor to receive data indicating selection of a purchasable item depicted via the first storefront site;
    a search module executable by the hardware processor to retrieve information identifying the purchasable item from the first storefront site; and
    a shopping cart module executable by the hardware processor to:
        query a plurality of storefront sites based on the information to identify a third storefront site in addition to the first storefront site that sells the purchasable item; and
        send a purchase request for the purchasable item to a storefront site based on the data, wherein the storefront site is selected from the first storefront site and the third storefront site.

2. The system of claim 1, wherein the shopping cart module is executable by the processor to send a display to the display device to facilitate user selection of a purchase order resulting in the purchase request, wherein the display device identifies the purchasable item, the first storefront site, first purchase information associated with the first storefront site, the second storefront site, and second purchase information associated with the third storefront site.

3. The system of claim 1, wherein the search module is further adapted to identify purchase information associated with the purchasable item.

4. The system of claim 1, wherein a particular storefront site of the plurality of storefront sites is the second storefront site, and wherein the particular storefront site offers a second item for sale.

5. The system of claim 1, wherein the shopping cart module selects the storefront site to which the purchase request is sent based on a user setting.

6. The system of claim 5, wherein the user setting includes a lowest price setting.

7. The system of claim 5, wherein the user setting includes an availability setting.

8. The system of claim 5, wherein the user setting includes a total cost of order setting.

9. The system of claim 5, wherein the user setting includes a shipping time setting.

10. The system of claim 1, wherein the shopping cart module is executable by the processor to automatically send the purchase request to the storefront site when purchase information associated with the storefront site satisfies a user setting threshold.

11. The system of claim 1, further comprising a wide area network interface to communicate with the storefront site via a television system.

12. The system of claim 1, wherein the storefront site is not associated with any of the plurality of the selectable and independent display elements.

13. A method comprising:
    sending an interactive graphical display to a display device via a computing device, wherein the interactive graphical display includes a plurality of selectable and independent display elements associated with a representation of a three-dimensional object, and wherein a first selectable and independent display element represents a first storefront site and a second selectable and independent display element represents a second storefront site different than the first storefront site;
    receiving, at the computing device, data indicating selection of a purchasable item depicted via the first storefront site;
    retrieving information identifying the purchasable item from the first storefront site;
    determining, via the computing device and based on the information, a third storefront site in addition to the first storefront site that sells the purchasable item;
    selecting a particular storefront site based on a user setting, wherein the particular storefront site is the first storefront site or the third storefront site; and
    sending a purchase request to the particular storefront site.

14. The method of claim 13, wherein the three-dimensional object has a spherical shape.

15. The method of claim 14, further comprising:
    receiving a command to rotate the three-dimensional object; and
    changing the interactive graphical display in response to the command.

16. The method of claim 13, wherein the three-dimensional object is a representation of a plurality of storefronts.

17. The method of claim 13, wherein the particular storefront is not associated with a selectable and independent display element of the plurality of selectable and independent display elements.

18. The method of claim 13, wherein the user setting comprises a lowest prices setting, an availability setting, a total cost of order setting, or a shipping time setting.

19. A computer-readable storage device comprising instructions, that when executed by a processor, cause the processor to perform operations including:
- sending an interactive graphical display to a display device, wherein the interactive graphical display includes a plurality of selectable and independent display elements associated with a representation of a three-dimensional object, and wherein a first selectable and independent display element represents a first storefront site and a second selectable and independent display element represents a second storefront site different than the first storefront site;
- receiving data indicative of selection of a purchasable item depicted via the first storefront site;
- retrieving information identifying the purchasable item from the first storefront site;
- determining, based on the information, a third storefront site in addition to the first storefront site that sells the purchasable item;
- selecting a particular storefront site based on a user setting, wherein the particular storefront site is one of the first storefront site and the third storefront site; and
- sending a purchase request to the particular storefront site for the purchasable item.

20. The computer-readable storage device of claim 19, wherein the operations further include selecting the particular storefront site based on a user setting.

21. The computer-readable storage device of claim 19, wherein the user setting comprises a lowest prices setting, an availability setting, a total cost of order setting, or a shipping time setting.

22. The computer-readable storage device of claim 19, wherein the user setting includes a listing of unacceptable storefronts.

23. A computer-readable storage device comprising instructions, that when executed by a processor, cause the processor to perform operations including:
- receiving data indicative of selection of a first storefront site from a display that features a plurality of storefront sites;
- receiving data indicative of selection of a purchasable item from the first storefront site;
- retrieving information identifying the purchasable item from the first storefront site;
- determining, based on the information, a second storefront site in addition to the first storefront site that sells the purchasable item;
- selecting a particular storefront site based on a user setting, wherein the particular storefront site is one of the first storefront site and the second storefront site; and
- sending a purchase request to the particular storefront site.

24. The computer-readable storage device of claim 23, wherein the particular storefront site is not a storefront site of the plurality of storefront sites.

25. The computer-readable storage device of claim 23, wherein the user setting comprises a lowest prices setting, an availability setting, a total cost of order setting, or a shipping time setting.

* * * * *